United States Patent
Teng et al.

(10) Patent No.: US 6,460,048 B1
(45) Date of Patent: Oct. 1, 2002

(54) METHOD, SYSTEM, AND PROGRAM FOR MANAGING FILE NAMES DURING THE REORGANIZATION OF A DATABASE OBJECT

(75) Inventors: James Zu-Chia Teng, San Jose; Jeffrey James Todd, Aromas, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,075

(22) Filed: May 13, 1999

(51) Int. Cl.⁷ .............................. G06F 17/00; G06F 7/00
(52) U.S. Cl. ................................................. 707/103 R
(58) Field of Search .................... 707/1–10, 100–104.1, 707/200–204, 205, 103 R

(56) References Cited

U.S. PATENT DOCUMENTS

| | | | |
|---|---|---|---|
| 4,714,996 A | | 12/1987 | Gladney et al. ............ 364/300 |
| 4,809,170 A | | 2/1989 | Leblang et al. ............ 364/200 |
| 5,222,235 A | * | 6/1993 | Hintz et al. ................ 395/600 |
| 5,327,556 A | | 7/1994 | Mohan et al. ............. 395/600 |
| 5,455,945 A | * | 10/1995 | VanderDrift ............... 395/600 |
| 5,721,915 A | * | 2/1998 | Sockut et al. ............. 395/616 |
| 5,758,357 A | * | 5/1998 | Barry et al. ................ 707/202 |
| 5,812,773 A | | 9/1998 | Norin ..................... 395/200.34 |
| 5,812,793 A | | 9/1998 | Shakib et al. .......... 395/200.31 |
| 5,887,274 A | * | 3/1999 | Barry et al. ................ 707/202 |
| 5,933,820 A | * | 8/1999 | Beier et al. ..................... 707/1 |
| 5,940,832 A | * | 8/1999 | Hamada et al. ............ 707/100 |
| 5,991,761 A | * | 11/1999 | Mahoney et al. .......... 707/100 |
| 6,026,412 A | * | 2/2000 | Sockut et al. .............. 707/200 |
| 6,070,170 A | * | 5/2000 | Friske et al. ............... 707/202 |
| 6,122,640 A | * | 9/2000 | Pereira ....................... 707/103 |
| 6,144,970 A | * | 11/2000 | Bonner et al. ............. 707/206 |

OTHER PUBLICATIONS

U.S. Ser. No. 09/192,676, filed Nov. 16, 1998, entitled "Method and Apparatus for Random Update Synchronization Among Multiple Computing Devices".

IBM Corp. Technical Disclosure Bulletin, vol. 27, No. 8, "Caching and Recovery of Catalog Information in Distributed query Compilation" by L.M. Haas and B.G. Lindsay, Jan. 1985, pp. 4795–4797.

IBM Corp. Technical Disclosure Bulletin, vol. 31, No. 5, "Data Access Architecture", Oct. 1988, pp. 30–32.

IBM Corp. Systems Journal, vol. 36, No. 3—nontopical issue "A Method For On–Line Reorganization of a Database" by G.H. Sockut, T.A. Beavin and C.C. Chang, Mar. 1997, pp. 1–26.

IBM Corp. DB2 for OS/390 Version 5 "Administration Guide", Chap. 2, pp. 2–67–2–72, Jun. 1997.

* cited by examiner

Primary Examiner—John Breene
Assistant Examiner—Linh Black
(74) Attorney, Agent, or Firm—David W. Victor; Konrad Raynes Victor & Mann

(57) ABSTRACT

Disclosed is a system, method, and program for reorganizing at least one database object. The database object is comprised of at least one database file. Each database file has a name. Source database files including data for the database objects subject to the reorganization have source names. Shadow copies of the source database files are created and shadow names for the shadow copies are generated, such that the source names and corresponding shadow names are different. The data in the shadow copies is reorganized. After the reorganization, the shadow names are used to access the database files for the reorganized database objects.

42 Claims, 2 Drawing Sheets

METHOD, SYSTEM, AND PROGRAM FOR MANAGING FILE NAMES DURING THE REORGANIZATION OF A DATABASE OBJECT

BACKGROUND OF THE INVENTION

1. Field of the Invention

The present invention relates to a method, system, and program for managing file names during the reorganization of the database files that include data for the database objects subject to the reorganization process.

2. Description of the Related Art

To reduce the amount of time to physically access database records from storage, it is desirable to physically store related database records near one another. Database records may be logically related according to a key or index value. This process of storing records ordered according to a key value close to one another is referred to as clustering. Clustering describes the arrangement of the rows of a database in physical storage according to the ordering of index keys. In this way, with clustering, data records are arranged in storage such that the logical ordering of records according to index keys corresponds to the physical ordering of the data records on the storage device. If related records are stored in physical proximity on a hard disk drive surface, then the database program will access records faster, thereby improving system performance. Access time is reduced by storing related records in close physical proximity because the seek and rotational times to move from one record to the next on the storage device, such as a hard disk drive, are minimized.

Nevertheless, as records are inserted and deleted from a database table, the degree of clustering is degraded. Description of the causes for degradation of clustering is described in an International Business Machines Corporation (IBM) publication entitled "A Method for On-Line Reorganization of a Database," by G. H. Sockut, T. A. Beaving, and C.-C. Chang, having IBM document no. G321-5651 (March 1997) and the commonly assigned patent entitled "Interaction Between Application of a Log and Maintenance of a Table that Maps Record Identifiers During Online Reorganization of a Database," U.S. Pat. No. 5,721,915, which publication and patent are incorporated herein by reference in their entirety.

Writing and updating of records in a database can reduce the degree of clustering, which increases the time to access related database records as such records are not maintained within close physical proximity. Database programs include a reorganization process to restore clustering to improve access performance. Reorganization also improves space utilization by removing dropped tables and rows, eliminating pointers to overflow records, etc. On-line reorganization methods seek to minimize the time during which the database is unavailable for users to access. Allowing users to access databases during reorganization is essential for large or highly available database where continuous availability is crucial. Examples of highly available databases include those for reservation systems, finance (especially global finance), process control, hospitals, police and armed forces. Even less essential applications prefer high availability. Further reorganization of very large databases can take considerable amounts of time. Thus, taking such less essential, large databases off-line for a substantial amount of time is also undesirable. On-line reorganization methods strive to minimize the time during which the database is unavailable.

Current on-line reorganization methods first unload or copy out the data from the old (original) copy to a shadow copy. The shadow copy of unloaded data is then sorted and ordered by a clustering key to optimize the clustering of the data in the shadow copy according to an index key. While the shadow copy is being sorted, applications can read and write data to the old copy. Any updates, i.e., writes, to the old copy while the shadow copy is being sorted and clustered are entered in a log. The reorganization applies to any database objects related to the database object being organized. For instance, if a table space and index space are being reorganized, then all tables within the table space and the index in the index space are also reorganized. In a third phase, the reorganization routine updates the shadow copy with the logged entries of updates to the old copy to make the shadow copy reflect recent update activity.

At the end of the phase of applying the log updates to the shadow copy, the SWITCH phase begins during which the updated shadow copy is renamed to the old copy. During the SWITCH phase, any access requests to the database objects involved in the reorganization are queued until the SWITCH phase is complete. Access requests are delayed and may time-out if the SWITCH phase exceeds a pre-defined time-out period. The renaming process involves renaming the old copy to a temporary name and renaming the shadow copy to the name of the old copy. The old copy may then be deleted. With this method, there are two renaming operations for each database object to be renamed. This SWITCH process can take several minutes during which the database is off-line.

There is thus a need in the art to improve the reorganization process to further minimize the time during which a database is off-line, which is especially problematic for highly available databases.

SUMMARY OF THE PREFERRED EMBODIMENTS

To overcome the limitations in the prior art described above, preferred embodiments disclose a system, method, and program for reorganizing at least one database object. The database object is comprised of at least one database file. Each database file has a name. Source database files including data for the database objects subject to the reorganization have source names. Shadow copies of the source database files are created and shadow names for the shadow copies are generated, such that the source names and corresponding shadow names are different. The data in the shadow copies is reorganized. After the reorganization, the shadow names are used to access the database files for the reorganized database objects.

In further embodiments, a database file name is comprised of multiple elements including a qualifier element.

Additional embodiments include system information indicating the name of the database files that include data for database objects. The system information is processed to determine the source database files that include data for the database objects subject to the reorganization. The system information is modified to indicate that the database files for the reorganized database objects are the shadow names. The shadow names are different from the source names of the source database files from which the shadow copies were created.

In yet further embodiments, the system information includes a value of the qualifier element, wherein the value of the qualifier element is one of a first value and a second value. During the process of generating the shadow name, the system information is processed to determine whether the qualifier element of the source database file is one of the first value and the second value. The shadow name is then set to the source name. The qualifier element in the shadow name is set to the first value after determining that the qualifier element indicated in the system information is the second value or set to the second value after determining that the qualifier element indicated in the system information is the first value.

Preferred embodiments provide a method for indicating to a database program the names of the reorganized database files. With preferred embodiments, the source database files that are reorganized do not need to be renamed nor do the reorganized database files need to be renamed to the source names of the database files that were subject to the reorganization. Instead, system information is updated to identify the shadow names of the reorganized database files as the new reorganized database files. Thus, the shadow copies are made the source database files by updating system information. The database program processes this updated system information to determine the database file to access when accessing the reorganized database objects. In this way, preferred embodiments further minimize the time the database objects are unavailable for access by avoiding the step of renaming the reorganized copies of the database files to the source names of the database files.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

A database is a set of database objects, such as table spaces, index spaces, tables, indexes, views, etc., in which the data and other indexing information resides. All data in a database is maintained in tables, which are a collection of rows all having the same columns. One or more indexes may be associated with each table. An index is an ordered set of pointers to data in the table based on the data in one or more columns of the table. The table spaces and index spaces including the table and index objects, respectively, associated with a database are stored in files referred to as data sets. A table space is comprised of one or more data sets in which one or more tables are stored and an index space is comprised of one or more data sets in which an index is stored. Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

Figure 1:
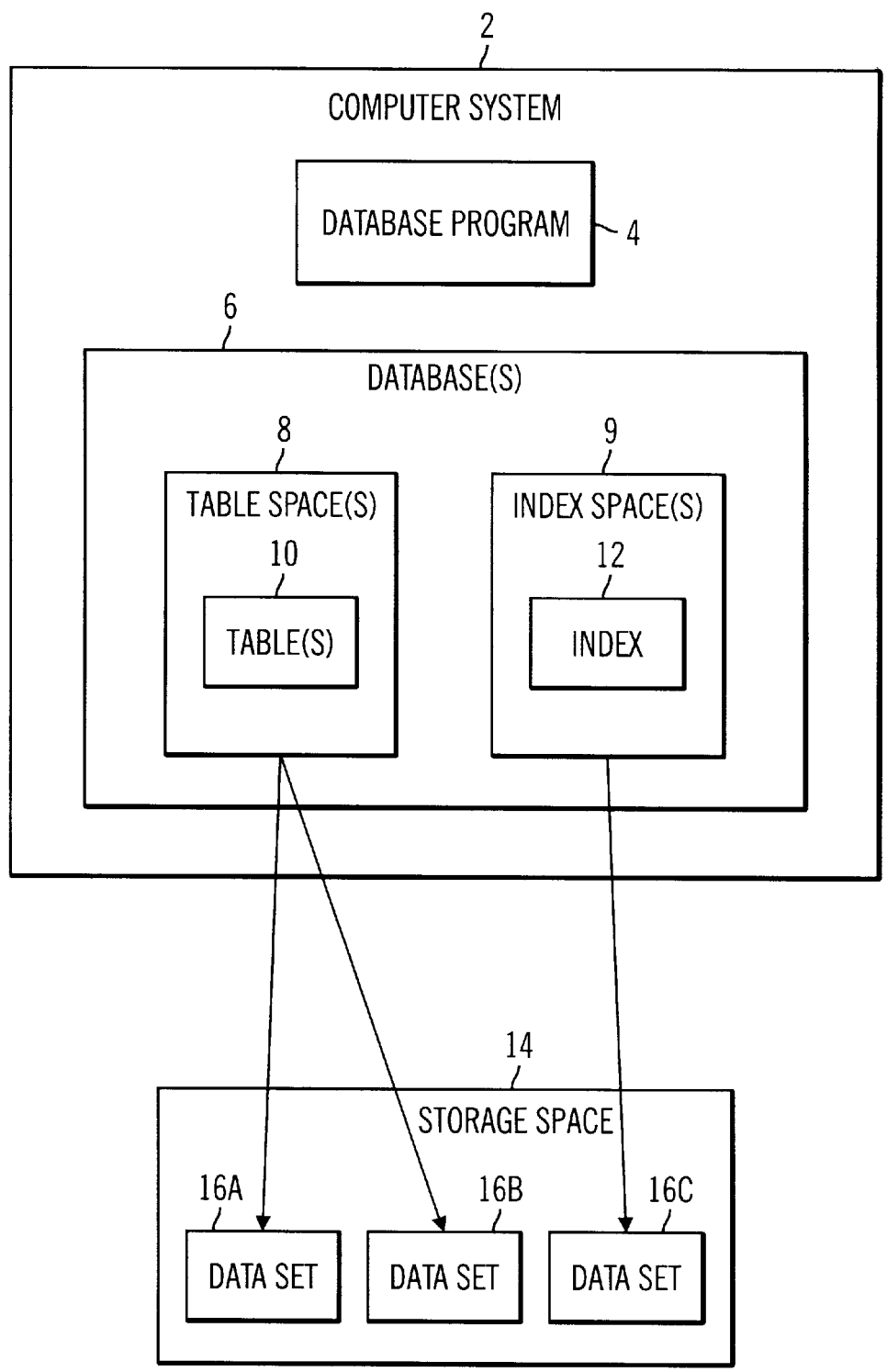
FIG. 1 is a block diagram illustrating a software and hardware environment in which preferred embodiments of the present invention are implemented.

FIG. 1 illustrates a computing environment in which a database may be implemented. A computer system 2, which may be a computer including an operating system such as MICROSOFT® WINDOWS® 98 and WINDOWS NT®, AIX®, OS/390®, OS/2®, MVS™, etc., includes a database program 4, such as DB2™, MICROSOFT® Access, Oracle Corporation's ORACLE 8®, etc. The database program 4 is used to access database information maintained in one or more databases 6. The database(s) 6 may consist of one or more table spaces 8, which include related tables 10 and one or more index spaces 9 that each include an index 12 to the data in the tables 10. A storage space 14 stores the actual data sets 16A, B, C which include the tables spaces 8 and index spaces 9. The storage space 14 may comprise a non-volatile storage space, such as a direct access storage device (DASD), which is comprised of numerous hard disk drives linked together. Alternatively the storage space 12 may comprise storage pools within non-volatile memory, or a combination of non-volatile and volatile memories. The high-speed, volatile memory may store data sets 16A, B, C that include the tables 10 and indexes 12 currently being accessed by the database program 4. Non-volatile memory may store data sets 16A, B, C that are not currently being accessed. In the example illustrated in FIG. 1, table space(s) 8 are stored in data sets 16A, B and index space(s) 9 are stored in data set 16C.

**Microsoft, Windows, and Windows NT are registered trademarks of Microsoft Corporation; DB2, AIX, OS/390, and OS/2 are registered trademarks of IBM, MVS is a trademark of IBM; and Oracle8 is a trademark of Oracle Corporation.

Reorganization can be performed on all the objects within a database 6, or on selected database objects, such as table spaces 8, index spaces 9, tables 10, and/or indexes 12. A reorganization of a table space 8 would involve the reorganization of all the related tables 10 and indexes 12, which are themselves comprised of numerous data sets 16A, B, C. Thus, the actual reorganization process is performed on the data sets 16A, B, C that underlie the tables and/or indexes subject to the reorganization.

In preferred embodiments, a data set name may conform to the naming scheme used in DB2 where a data set name includes separate elements or components referred to as qualifiers. These qualifiers (elements) of the data set name provide information on the database, such as a table or index with which the data set is associated. Each qualifier is separated by a period as shown in the DB2 data set name format below:

catname.DSNDBx.dbname.psname.I0001.Annn

The "catname" qualifier is the integrated catalog name or alias of the database 6. The "dbname" is the database name to which the data set belongs. The "psname" is the table space or index name to which the data set is associated and the nnn is a data set number. The fifth qualifier element, I0001, is used during the reorganization process to rename the data sets.

The reorganization process involves reorganizing all the data sets that comprise the database object(s) subject to the reorganization. In the current DB2 reorganization process, the original copy of the data sets involved in the reorganization have a fifth qualifier of I0001 and the shadow copy has a fifth qualifier named S0001. The SWITCH phase in the current reorganization process involves renaming the old and shadow copies of the data sets involved in the reorganization. During the SWITCH phase, the fifth qualifier, I0001, of the data set names of the original data sets are renamed from I0001 to T0001, which is a temporary name. The fifth qualifiers S0001 of the reorganized shadow copies of all the data sets are renamed from S0001 to I0001, and the renamed index components T0001 of the renamed original data sets are renamed a second time to S0001. This renaming process may be performed by the database program 4 or by a user issuing database commands to rename the data sets as described above. Both the database program 4 and user can determine the data sets for the database objects involved in a reorganization as the data set name indicates the database objects to which the data set is associated. The result of the renaming operation during the SWITCH or renaming phase in the current on-line reorganization process is that the database program 4 can now access the reorganized and updated data sets using the name previously used, i.e., the data set names having a fifth qualifier of "I0001."

The renaming phase during the current reorganization processes can involve a large number of data sets or files when the database object reorganized has many associated tables and indexes. As described above, the renaming process involves three renaming steps. Each of these renaming steps must be performed with respect to each data set related to the database object being reorganized. This results in numerous disk input/output operations taking several seconds. The sum total of all renaming operations for all data sets can involve several minutes, depending on the number of data sets involved. Thus, the renaming process in current on-line reorganization methods can result in the database being unavailable for a significant period of time, which is highly undesirable for databases 6 that must be highly available.

Preferred embodiments provide a new method for performing the renaming portion of the reorganization process. In preferred embodiments, a data set maintains the same naming convention described above. However, certain of the data structures or system tables used to maintain information on the database objects, e.g., tables 8, index(es) 10, table space(s) 6, etc., would include a field indicating a current version of an element within the name of the data sets containing the database object being reorganized. In preferred embodiments, the fifth qualifier element of a data set name 25 may have one of two values, an "I" or "J" version, corresponding to a fifth qualifier of I0001 or J0001. Information on the current version of the fifth qualifier of the current data sets may be maintained in system tables that provide information on table spaces, index spaces, tables, and indexes. For instance, in DB2, the SYSIBM. SYSTABLEPART table contains one row of information for each non-partitioned and partitioned table in the database and the SYSINDEXPART table contains one row of information for each partitioned and non-partitioned index in the database. Each of these tables include columns of information to identify and provide configuration information on the database objects. In preferred embodiments, these tables are modified to include an additional column, called the IPREFIX column, that indicates the current version of the fifth qualifier element for data sets that comprise the table or index as "I" or "J."

Further, in the DB2 environment, the database descriptor (DBD) may indicate the current version, "I" or "J", of the fifth qualifier for certain data sets. For each database 6, there is a DBD which provides internal control blocks for a database. A DBD describes the table spaces 8, index spaces 9, tables 10, indexes 12, relationships, etc., of a database 6. In preferred embodiments, the DBD may be modified to include information on the current "I" or "J" version of the fifth qualifier for data sets.

In preferred embodiments, when the database program 4 proceeds to access a database object, e.g., table space 8, index space 9, table 10 or index 12, the database program 4 would determine the name of the data sets to access and the current version of the fifth qualifier, "I0001" or "J0001" for the data sets to access. The database program 4, when reading or writing to data sets, would access the data set name 20 including the current version of the fifth qualifier. For instance, if the system tables and/or DBD for the database 6 indicate that the current version of the fifth qualifier for data sets 14A, B, C of the database 6 was "I," then the database program 4 would access data sets having the name:

catname.DSNDBx.dbname.psname.I0001.Annn, where the fifth qualifier is I0001. Otherwise, if the system tables and/or DBD indicated that the current version of the fifth qualifier was "J", then the database program 4 would access data sets having the name:

catname.DSNDBx.dbname.psname.J0001.Annn, where the fifth qualifier is J0001.

Figure 2:
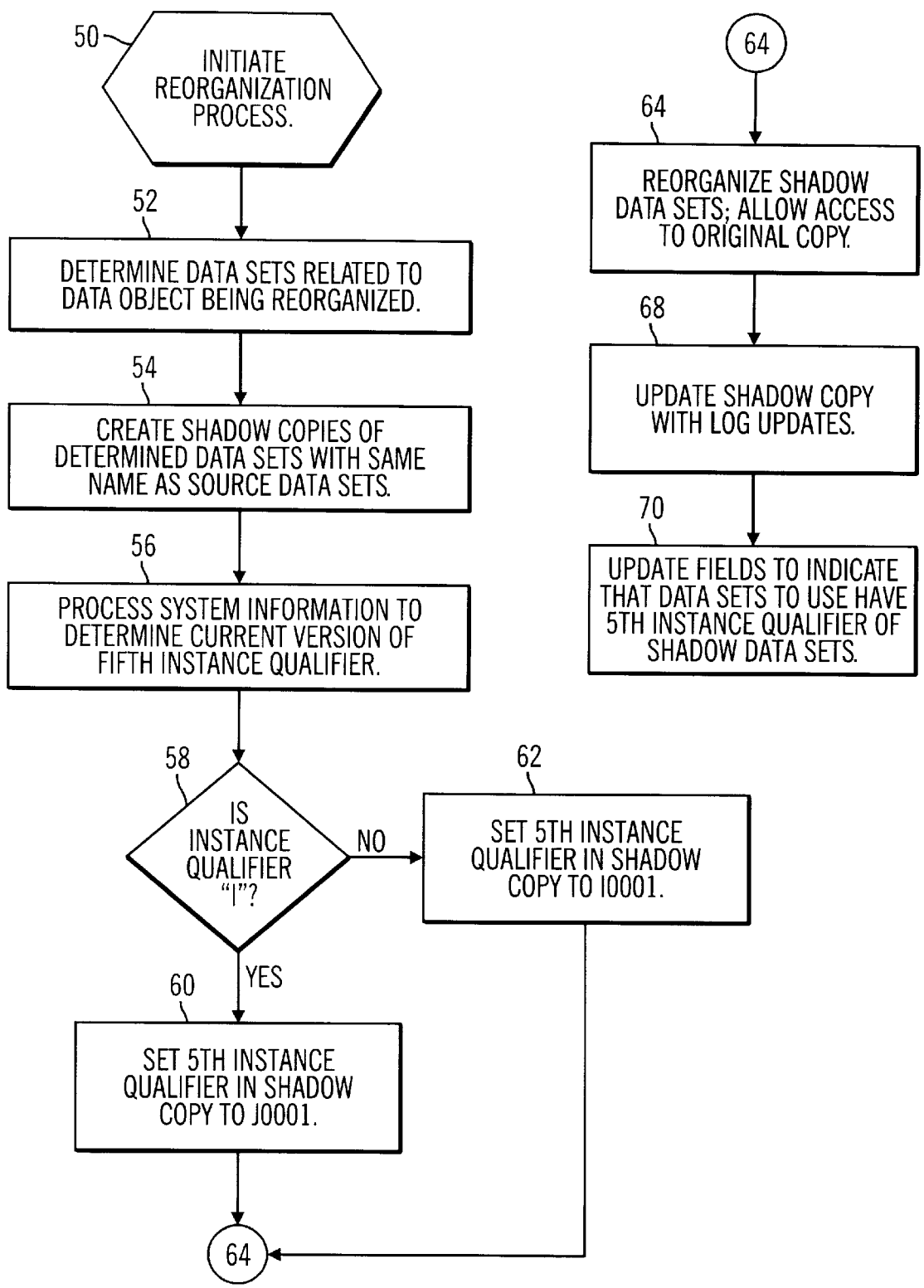
FIG. 2 illustrates logic to name files during reorganization of database objects in accordance with preferred embodiments.

FIG. 2 illustrates program logic included within the reorganization process to manage the file names of the reorganized data sets in accordance with preferred embodiments. Control begins at block 50 where the reorganization process is initiated with respect to one or more database objects. This may be initiated by a user executing the REORG command in DB2. The database program 4, or user issuing database commands, then determines (at block 52) the data sets including the data for the database objects, e.g., tables and/or indexes, subject to the reorganization process. 10 The database program 4 then creates (at block 54) shadow copies of the determined data sets with the same name as the source data sets. The database program 4 then processes the system information (at block 56), such as the system tables or DBD, to determine (at block 58) the current version of the fifth instance qualifier, i.e., "I" or "J" for each data set involved in the reorganization. It is possible that data sets can have different fifth instance qualifiers if some data sets are subject to a different number of previous reorganizations.

If the fifth instance qualifier for a data set subject to the reorganization is "I", then the database program 4 sets (at block 60) the fifth instance qualifier of the corresponding shadow copy name for such data set to J0001. If the determined current instance qualifier is "J", then the database program sets (at block 62) the fifth instance qualifier of the corresponding shadow copy name to I0001. The operations at blocks 58, 60, and 62 would be performed for each data set subject to reorganization. In this way, the name of each shadow copy and corresponding original data set differ according to the fifth instance qualifier. After setting the name of the shadow copies of the data sets, including the fifth instance qualifier, the database program 4 proceeds to reorganize (at block 64) the shadow copies of the data sets, while allowing users to read and write to the original copy. Updates to the original copy are indicated in a log file. After reorganizing the data sets, the database program 4 updates (at block 68) the shadow copies of the data sets with the log updates. After completely updating the shadow copies with the log entries, the database program 4 then updates (at block 70) system information, such as the IPREFIX field in the system tables or the DBD, to indicate that the current version of the fifth instance qualifier is the value of the fifth instance qualifier of the shadow copies of the data sets.

Alternatively, the database program 4 merely switches the current value of the instance qualifier maintained in the system information to the other value, i.e., from "I" to "J" or from "J" to "I." Thus, the system information indicates that the reorganized shadow copies are the active data sets to access when accessing the tables and indexes that are stored in the data sets.

In preferred embodiments, the instance qualifier of the data sets will fluctuate between one of two values "I" or "J." If the default instance qualifier is I0001, then after the first reorganization, the database program 4 will access the data sets using the J0001 instance qualifier in the data set name. If the data sets are reorganized a second time, then the data set reorganized for a second time will have the I0001 instance qualifier. After this second reorganization, the database program 4 will then access the data sets using the I0001 instance qualifier. In this way, the instance qualifier component of data set names alternates between I0001 and J0001 each time the data sets are reorganized.

Further, it is possible that database objects within the same table space may have different instance qualifiers, depending on how many times those particular database objects have been subject to reorganization. Accordingly, the system information may provide different instance qualifiers for the data sets associated with different database objects. In the case where there are different instance qualifiers for the data sets involved in a reorganization, the determination of the fifth instance qualifier during reorganization may be performed on a data set by data set basis. The shadow copies created during such a reorganization would also have different fifth instance qualifiers. Still further, the system information would be modified on a data set by data set basis, with the fifth instance qualifiers having different values for different data sets.

At the completion of the reorganization process, the database program 4 or user may leave the old data sets on the system or delete the old data sets. Leaving the old data sets in storage reserves the storage space utilized by the old data sets for use by future shadow copies created during future reorganizations with the assumption that the optimal use for such storage space is for shadow copies created during reorganization.

With the preferred name management technique, the step of taking the database offline while the reorganized, shadow copies, are renamed to the name of the data sets that were reorganized is eliminated. Elimination of the renaming operation reduces the time during which the database objects involved in the reorganization are inaccessible. With the preferred embodiments, after the data sets are reorganized, the database program updates system information to reflect that a new name of the database file as the reorganized shadow copy. Thus, the database is only unavailable while the system information is updated, which takes significantly less time than the renaming operation currently used. After the system information is update, data sets are accessed using the new name as indicated in the fifth instance qualifier of the data set name.

Preferred embodiments, further minimize the time during which databases are inaccessible during the SWITCH process, which previously involved multiple renaming operations. Preferred embodiments improve the availability of the database regardless of the number of data sets, and corresponding indexes and tables, that are involved in the reorganization. Thus, users do not have to manage their database to limit the number of indexes and tables, and underlying data sets, to avoid the delays that such a large number of data sets would cause during the SWITCH renaming process. The renaming process of the preferred embodiments does not necessarily experience greater unavailability as the number of data sets involved in the reorganization process increases.

Conclusions/Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications that may be made to this configuration without departing from the scope of the present invention.

Preferred embodiments were described with respect to data set names conforming to the DB2 naming format, where the fifth qualifier or element of the name determines the current version to use. However, those skilled in the art will appreciate that preferred embodiments may apply to any naming format for the data sets and are not limited to the DB2 naming format. Thus, the element that indicates a version of the data set name to use may be any component or element of a name, or alternatively, other information associated with a data set that indicates the current version of the name to use.

Preferred embodiments were described with respect to two possible versions of a qualifier with a data set name, the "I" or "J" version. However, in alternative embodiments there may be any number of version numbers for the name or fifth element qualifier.

Preferred embodiments were described with respect to indicating a name for reorganized data sets that the database program accesses. In alternative embodiments, the modification of the version number of the file or database object to access is not necessarily limited to data set names, and may involve any other type of database object. In this way, preferred embodiments may be utilized to indicate a version of a database object to access, not just data sets or files to access.

Further, in preferred embodiments, data sets are the files or data structures maintaining the information for database objects such as tables and indexes. In alternative embodiments, other types of data structures or files may be utilized to maintain information on the tables and indexes and to maintain information on the name of the data sets to access.

The steps of providing the name for the shadow copy of the data set and then indicating that the shadow data set name is the active name to use in future database operations may be performed by the database program 4 or manually by a user issuing database program commands.

Preferred embodiments were described with respect to the renaming phase of an on-line database reorganization process. However, the renaming process of the preferred embodiments may apply to any type of reorganization process, including those reorganization processes where the database is taken offline during the sorting of the database objects.

In summary, preferred embodiments disclose a system, method, and program for reorganizing at least one database object. The database object is comprised of at least one database file. Each database file has a name. Source database files including data for the database objects subject to the reorganization have source names. Shadow copies of the source database files are created and shadow names for the shadow copies are generated, such that the source names and corresponding shadow names are different. The data in the shadow copies is reorganized. After the reorganization, the shadow names are used to access the database files for the reorganized database objects.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for reorganizing at least one database object, wherein the database object is comprised of at least one database file, and wherein each database file has a name, comprising:

providing source database files including data for the database objects subject to a reorganization, wherein the source database files have source names;

creating shadow copies of the source database files;

generating shadow names for the shadow copies, wherein the source names and corresponding shadow names are different;and reorganizing data in the shadow copies including database objects, wherein after the reorganization, the shadow names are used to access the database files for the reorganized database objects.

2. The method of claim 1, further comprising performing read/write operations with respect to the source database files while reorganizing the data in the shadow copies.

3. The method of claim 1, wherein a database file name is comprised of multiple elements including a qualifier element.

4. A method for reorganizing at least one database object, wherein the database object is comprised of at least one database file, and wherein each database file has a name, comprising:

providing source database files including data for the database objects subject to a reorganization, wherein the source database files have source names, and wherein a database file name is comprised of multiple elements including a qualifier element;

providing system information indicating names of the database files that include data for database objects, wherein providing the source database files includes processing the system information to determine the source database files that include data for the database objects subject to the reorganization;

creating shadow copies of the source database files;

generating shadow names for the shadow copies, wherein the source names and corresponding shadow names are different;

reorganizing data in the shadow copies, wherein after the reorganization, the shadow names are used to access the database files for the reorganized database objects; and modifying the system information, after reorganizing the database objects, to indicate that the names of the database files comprising the reorganized database objects are the shadow names, wherein the shadow names are different from the source names of the source database files from which the shadow copies were created.

5. The method of claim 4, wherein the system information includes a value of the qualifier element, wherein the value of the qualifier element is one of a first value and a second value.

6. The method of claim 5, wherein the qualifier element in the source name and shadow name are different and wherein the elements of the source name and shadow name other than the qualifier element are the same.

7. The method of claim 5, wherein generating the shadow names comprises:

processing the system information to determine whether the qualifier element of the source database file is one of the first value and the second value;

setting the shadow name to the source name;

setting the qualifier element in the shadow name to the first value after determining that the qualifier element indicated in the system information is the second value; and setting the qualifier element in the shadow name to the second value after determining that the qualifier element indicated in the system information is the first value.

8. The method of claim 7, further comprising:

performing additional instances of reorganizing the database files; and updating, after the reorganization, the system information to reflect that the qualifier elements of the reorganized database files have one of the first value and the second value, wherein the qualifier element value is updated to the first value if the qualifier element value prior to the reorganization was the second value and is updated to the second value if the qualifier element value prior to the reorganization was the first value.

9. The method of claim 7, wherein the system information is modified after reorganizing the data in the shadow copies by indicating that the qualifier element of the reorganized database file names is the qualifier element in the shadow name, wherein, after the reorganization, the database program accesses the reorganized database objects by accessing the database file names having the modified qualifier element indicated in the system information.

10. A system for reorganizing at least one database object, wherein the database object is comprised of at least one database file, and wherein each database file has a name, comprising:

a computer system;

a memory area accessible to the computer system including system information indicating names of the database files that include data for database objects;and program logic, executed by the computer system, comprising:

(i) means for providing source database files including data for the database objects to a reorganization, wherein the source database files have source names;

(ii) means for creating shadow copies of the source database files;

(iii) means for generating shadow names for the shadow copies, wherein the source names and corresponding shadow names are different; and (iv) means for reorganizing data in the shadow copies including database objects, wherein after the reorganization, the shadow names are used to access the database files for the reorganized database objects.

11. The system of claim 10, wherein the program logic further comprises means for performing read/write operations with respect to the source database files while reorganizing the data in the shadow copies.

12. The system of claim 10, wherein a database file name is comprised of multiple elements including a qualifier element.

13. A system for reorganizing at least one database object, wherein the database object is comprised of at least one database file, and wherein each database file has a name, comprisng:

a computer system;

a memory area accessible to the computer system including system information indicating names of the database files that include data for database objects;and program logic, executed by the computer system, comprising:

(i) means for providing source database files including data for the database objects subject to a reorganization, wherein the source database files have source names, and wherein a database file name is comprised of multiple elements including a qualifier element;

(ii) means for providing system information indicating names of the database files that include data for database objects, wherein providing the source database files including processing the system information to determine the source database files that include data for the database objects subject to the reorganization;

(iii) means for creating shadow copies of the source database files;

(iv) means for generating shadow names for the shadow copies, wherein the source names and corresponding shadow names are different; and (v) means for reorganizing data in the shadow copies, wherein after the reorganization, the shadow names are used to access the database files for the reorganized database objects; and (vi) means for modifying the system information, after reorganizing the database objects, to indicate that the names of the database files comprising the reorganized database objects are the shadow names, wherein the shadow names are different from the source names of the source database files from which the shadow copies were created.

14. The system of claim 13, wherein the system information includes a value of the qualifier element, wherein the value of the qualifier element is one of a first value and a second value.

15. The system of claim 14, wherein the qualifier element in the source name and shadow name are different and wherein the elements of the source name and shadow name other than the qualifier element are the same.

16. The system of claim 15, wherein the means for generating the shadow name, comprises:

means for processing the system information to determine whether the qualifier element of the source database file is one of the first value and the second value;

means for setting the shadow name to the source name;

means for setting the qualifier element in the shadow name to the first value after determining that the qualifier element indicated in the system information is the second value; and means for setting the qualifier element in the shadow name to the second value after determining that the qualifier element indicated in the system information is the first value.

17. The system of claim 16, wherein the program logic further comprises:

means for performing additional instances of reorganizing the database files; and means for updating, after the reorganization, the system information in the memory area to reflect that the qualifier elements of the reorganized database files have one of the first value and the second value, wherein the qualifier element value is updated to the first value if the qualifier element value prior to the reorganization was the second value and is updated to the second value if the qualifier element value prior to the reorganization was the first value.

18. The system of claim 16, wherein the system information is modified after reorganizing the data in the shadow copies by indicating that the qualifier element of the reorganized database file names is the qualifier element in the shadow name, wherein, after the reorganization, the database program accesses the reorganized database object by accessing the database file names having the modified qualifier element indicated in the system information.

19. An article of manufacture for reorganizing at least one database object, wherein the database object is comprised of at least one database file, and wherein each database file has a name, the article of manufacture comprising computer usable media including at least one computer program embedded therein that is capable of causing a computer system to perform:

providing source database files including data for the database objects subject to a reorganization, wherein the source database files have source names;

creating shadow copies of the source database files;

generating shadow names for the shadow copies, wherein the source names and corresponding shadow names are different;and reorganizing data in the shadow copies including database objects, wherein after the reorganization, the shadow names are used to access the database files for the reorganized database objects.

20. The article of manufacture of claim 19, further comprising performing read/write operations with respect to the source database files while reorganizing the data in the shadow copies.

21. The article of manufacture of claim 19, wherein a database file name is comprised of multiple elements including a qualifier element.

22. An article of manufacture for reorganizing at least one database object, wherein the database object is comprised of at least one database file, and wherein each database file has a name, the article of manufacture comprising computer usable media including at least one computer program embedded therein that is capable of causing a computer system to perform:

providing system information indicating names of the database files that include data for database objects, wherein providing the source database files includes processing the system information to determine the source database files that include data for the database objects subject to the reorganization;

providing source database files including data for the database objects subject to a reorganization, wherein the source database files have source names, and wherein a database file name is comprised of multiple elements including a qualifier element;

creating shadow copies of the source database files;

generating shadow names for the shadow copies, wherein the source names and corresponding shadow names are different;

reorganizing data in the shadow copies, wherein after the reorganization, the shadow names are used to access the database files for the reorganized database objects; and modifying the system information, after reorganizing the database objects, to indicate that the names of the database files comprising the reorganized database objects are the shadow names, wherein the shadow names are different from the source names of the source database files from which the shadow copies were created.

23. The article of manufacture of claim 22, wherein the system information includes a value of the qualifier element, wherein the value of the qualifier element is one of a first value and a second value.

24. The article of manufacture of claim 23, wherein the qualifier element in the source name and shadow name are different and wherein the elements of the source name and shadow name other than the qualifier element are the same.

25. The article of manufacture of claim 23, wherein generating the shadow names comprises:

processing the system information to determine whether the qualifier element of the source database file is one of the first value and the second value;

setting the shadow name to the source name;

setting the qualifier element in the shadow name to the first value after determining that the qualifier element indicated in the system information is the second value; and setting the qualifier element in the shadow name to the second value after determining that the qualifier element indicated in the system information is the first value.

26. The article of manufacture of claim 25, further causing the computer system to perform:

performing additional instances of reorganizing the database files; and updating, after the reorganization, the system information to reflect that the qualifier elements of the reorganized database files have one of the first value and the second value, wherein the qualifier element value is updated to the first value if the qualifier element value prior to the reorganization was the second value and is updated to the second value if the qualifier element value prior to the reorganization was the first value.

27. The article of manufacture of claim 26, wherein the system information is modified after reorganizing the data in the shadow copies by indicating that the qualifier element of the reorganized database file names is the qualifier element in the shadow name, wherein, after the reorganization, the database program accesses the reorganized database objects by accessing the database file names having the modified qualifier element indicated in the system information.

28. The method of claim 1, wherein the shadow names and the corresponding source names are not exchanged.

29. The method of claim 1, wherein the source names are not renamed to the corresponding shadow names.

30. The system of claim 10, wherein the shadow names and the corresponding source names are not exchanged.

31. The system of claim 10, wherein the source names are not renamed to the corresponding shadow names.

32. The article of manufacture of claim 19, wherein the shadow names and the corresponding source names are not exchanged.

33. The article of manufacture of claim 19, wherein the source names are not renamed to the corresponding shadow names.

34. The method of claim 1, further comprising:

providing indication of a name qualifier;

using the name qualifier to determine the shadow names; and using the name qualifier to determine the source names after the reorganization.

35. The method of claim 34, wherein the name qualifier has one of two values, wherein using the name qualifier to determine the shadow names comprises using the name qualifier value for the shadow names that is different from a current name qualifier value.

36. The method of claim 35, further comprising:

changing the current name qualifier to the other value, wherein using the name qualifier to determine the source names comprises using the changed name qualifier value to determine the source names.

37. The system of claim 10, wherein the program logic further comprises:

means for providing indication of a name qualifier;

means for using the name qualifier to determine the shadow names; and means for using the name qualifier to determine the source names after the reorganization.

38. The system of claim 37, wherein the name qualifier has one of two values, wherein the means for using the name qualifier to determine the shadow names comprises using the name qualifier value for the shadow names that is different from a current name qualifier value.

39. The system of claim 38, wherein the program logic further comprises:

means for changing the current name qualifier to the other value, wherein the means for using the name qualifier to determine the source names comprises using the changed name qualifier value to determine the source names.

40. The article of manufacture of claim 19, further causing the computer system to perform:

providing indication of a name qualifier;

using the name qualifier to determine the shadow names; and using the name qualifier to determine the source names after the reorganization.

41. The article of manufacture of claim 40, wherein the name qualifier has one of two values, wherein using the name qualifier to determine the shadow names comprises using the name qualifier value for the shadow names that is different from a current name qualifier value.

42. The article of manufacture of claim 41, further causing the computer system to perform:

changing the current name qualifier to the other value, wherein using the name qualifier to determine the source names comprises using the changed name qualifier value to determine the source names.

* * * * *